Oct. 12, 1965  H. A. PERRY, JR  3,210,937
THRUST CONTROL APPARATUS
Filed April 10, 1962

INVENTOR.
HENRY A. PERRY, Jr.
BY
ATTY.
AGENT.

United States Patent Office 3,210,937
Patented Oct. 12, 1965

3,210,937
THRUST CONTROL APPARATUS
Henry A. Perry, Jr., Laytonsville, Md., assignor to the United States of America as represented by the Secretary of the Navy
Filed Apr. 10, 1962, Ser. No. 187,456
10 Claims. (Cl. 60—35.55)
(Granted under Title 35, U.S. Code (1952), sec. 266)

The invention described herein may be manufactured and used by or for the Government of the United States of America for governmental purposes without the payment of any royalties thereon or therefor.

This invention relates to means for varying, reversing or neutralizing the magnitude and direction of the thrust vector of a rocket in powered flight and more particularly to a simple apparatus for performing all of these functions which is provided in a single unit.

Heretofore, the magnitude of the thrust of a rocket in powered flight has been varied by changing the rate or stopping the combustion of the fuel. Alternatively, the magnitude of the thrust of a rocket has been neutralized or reversed by demolishing a portion of the rocket motor or its nozzle, or by venting the combustion products through a port or multiplicity of ports disposed variously on the lateral or forward portions of the rocket. The direction of the thrust of a rocket has been varied for steering purposes by swiveling the nozzles, by the insertion of deflecting surfaces into the exhaust, by injecting a fuel laterally into the exhaust, by the use of auxiliary rockets, by movable vanes disposed in the slip stream, or by deflecting the exhaust by electrical and/or magnetic fields.

The prior art means for varying, reversing or neutralizing the thrust vector of a rocket have been separate from the means for varying the direction of the thrust of the rocket. This separation of means has led to an undersirable complexity and weight in the construction of a rocket. In many types of rockets it is necessary to employ multiple nozzles and/or to locate the actuating mechanisms in intimate contact wth the flames or to employ hot-gas valves, which features add to the complexity and uncertainty of operation of the vectoring mechanism. The general purpose of this invention is to provide means for varying, reversing or neutralizing the magnitude and direction of the thrust vector of a rocket in powered flight which embraces all of the advantages of the prior art devices and possesses none of the aforedescribed disadvantages.

It is therefore an object of this invention to provide a new and improved apparatus of the character described.

It is another object to provide a new and improved apparatus in a single unit for controlling the magnitude and varying the direction of the thrust vector of a rocket in powered flight.

It is a further object to provide thrust control apparatus of the character described which is simple, compact and reliable in operation.

It is a still further object to provide this type of thrust control apparatus wherein the critical parts or actuating means are isolated from the extremes of temperature and stress which are generated by the combustion of fuel in the rocket.

Other objects and various further features of novelty and invention will be apparent to those skilled in the art from a reading of the following specification and claims in conjunction with the accompanying drawing which shows, for illustrative purposes only, a preferred form of the invention and in which:

Figure 1:
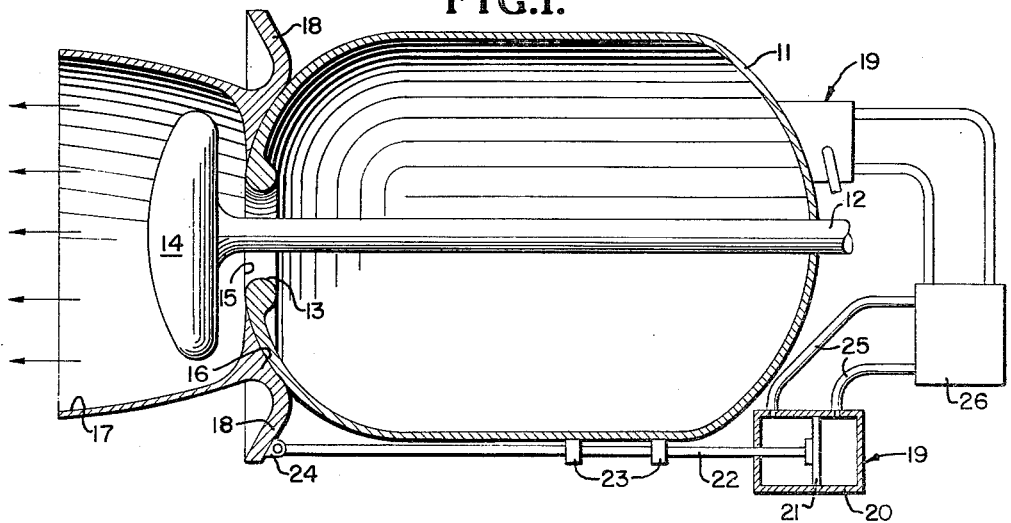
FIG. 1 is an elevational view, partly in section, of a preferred embodiment of the invention.

Referring now to FIG. 1, the reference numeral 11 designates a rocket motor casing which may be mounted by any suitable means within the rocket structure. A pintle 12 is rigidly mounted within the casing 11 and extends through an orifice 13 in the casing to support a plug 14 which is rigidly mounted thereon. The diameter of the plug 14 is larger than that of the orifice 13 in the casing 11 and also larger than the diameter of the opening 15 in the base 16 of a nozzle 17. The surfaces on either side of the nozzle base 16 correspond in shape to the interior surface of the plug 14 and to the exterior surface of the casing 11 adjacent the orifice 13, respectively, for sealing purposes when the nozzle base 16 is in contact with either of these other surfaces.

A curved flange 18 is provided on the nozzle base 16 and forms a cone-shaped outlet with the casing 11 for the combustion gases when the nozzle base 16 is not in contact with the aft end of the casing. The nozzle 17 is supported by three actuating units 19 which may be mounted in any suitable manner within the rocket structure and equally spaced around the circumference of the casing 11. Each of the units 19 comprises a cylinder 20 in which there is slidably mounted a piston 21 having a piston rod 22 which is slidably mounted on the rocket casing 11 by brackets 23. The free end of the piston rod 22 is movably mounted on a boss 24 which is rigidly mounted on the curved flange 18 of the nozzle base 16. A pair of fluid lines 25 extend into each of the cylinders 20 on either side of the piston 21 and the flow of fluid to each of the cylinders is controlled by a guidance control system 26 mounted in any suitable manner within the rocket structure. Only two pair of fluid lines 25 are shown in FIG. 1 since only two piston and cylinder units 19 are shown owing to the equal spacing thereof. With the nozzle base 16 seated against the aft end of the housing 11 as in FIG. 1 the products of combustion are expanded radially by the plug 14 and then further expanded aft by the nozzle 17 to provide axial thrust to the rocket.

Figure 2:
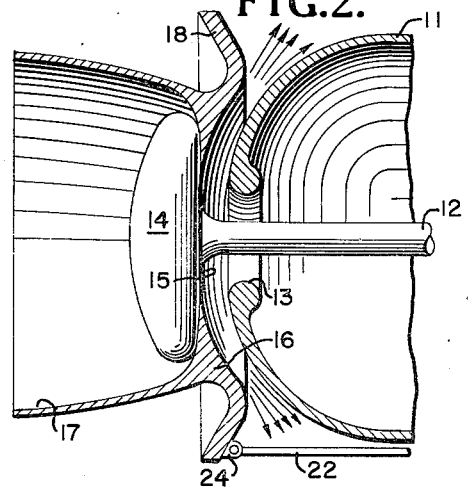
FIG. 2 is a sectional view showing substantially all of the apparatus of FIG. 1 with the movable nozzle displaced aft fully.

In FIG. 2 with the nozzle base 16 seated against the plug 14, the products of combustion are expanded radially by the plug 14 and are further expanded radially between the base 16 and the aft end of the motor casing 11. This expansion may provide no axial component of thrust or may provide thrust fore or aft in the rocket depending on the shape of the nozzle base and curved flange 18 and the aft end of the casing 11.

Figure 3:
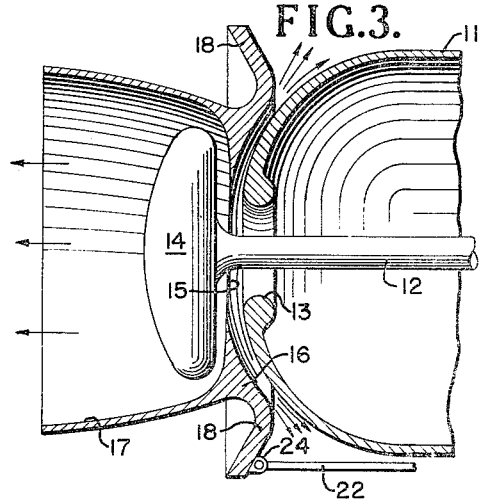
FIG. 3 shows the apparatus of FIG. 2 with the movable nozzle displaced aft partially.

In FIG. 3, when the movable nozzle has been displaced aft only partially, the products of combustion, which are partially expanded by the plug 14, are divided by the inner edge of the base 16, one portion of the flow being expanded aft by the nozzle 17 and the other portion of the flow being expanded radially between the nozzle base 16 and the aft end of the casing 11. This expansion will provide axial and conical thrust simultaneously, the relative magnitudes of which will be dependent on the shape of the surfaces of the nozzle base 16 and the aft end of the casing 11 and on the degree of axial displacement of the nozzle 17.

Figure 4:
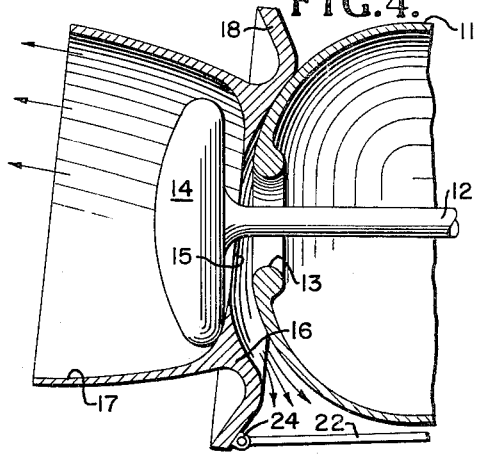
FIG. 4 shows the apparatus of FIG. 2 with the movable nozzle tilted.

In FIG. 4, when the nozzle has been tilted fully, the products of combustion, which are partially expanded by the plug 14, are further expanded on one side by the inner edge of the base 16 and the nozzle 17. On the other side, the other portion of the flow is further expanded radially between the base 16 and the aft end of the casing 11, thereby providing axial and conical thrust simultaneously. The relative magnitudes of these thrusts depend on the shape of the surfaces of the base 16 and the aft end of the casing 11 and on the degree of tilting and axial displacement of the nozzle 17.

The relative motions of the three actuating units 19 under the command of the guidance control system 26 will determine the degree of tilt and axial displacement of the nozzle 17 relative to the aft end of the casing 11. Thus, various combinations of tilt and axial displacement of the nozzle are possible, with the result that a simple means is provided for varying, reversing, neutralizing and vectoring the thrust, repeatedly, interchangeably and at will, in a single unit. Also, the critical parts of the actuating units are isolated from the extremes of temperature and stress which are generated by the combustion of the fuel within the motor casing.

Various modifications of this invention are possible without departing from the scope thereof; for example, the actuating units may be unequally spaced around the circumference of the rocket casing 11; different types of actuating units may be provided other than the fluid type shown herein; and the piston rods 22 may be embedded flush within the exterior of the casing 11 or may pass aft through the casing in packing glands, rather than being slidably mounted on the exterior of the casing by brackets as disclosed herein.

While the invention has been described in detail for the preferred form shown, it will be understood that various other modifications may be made within the scope of the invention as defined in the appended claims.

What is claimed is:

1. Apparatus for controlling the direction and magnitude of rocket thrust comprising a rocket motor casing having an orifice therein for the escape of combustion gases, a movable nozzle having a base portion with an opening therein adjacent said casing orifice, means for supporting said nozzle and for selectively tilting and axially displacing said nozzle with respect to said casing and selectively permitting simultaneous radial and axial escape of gas, a pintle rigidly mounted within said casing and extending through said casing orifice, and a plug portion on said pintle of larger diameter than said nozzle opening and located within said nozzle and adjacent said base portion.

2. The apparatus of claim 1 wherein said nozzle base portion has a radially extending curved flange portion with a plurality of bosses thereon.

3. The apparatus of claim 2 wherein said means for supporting said nozzle comprises a plurality of piston and cylinder units having piston rods which are movably attached to said bosses.

4. The apparatus of claim 3 wherein said piston rods are slidably mounted on said motor casing.

5. The apparatus of claim 3 including a guidance control system connected to said piston and cylinder units to control the actuation thereof.

6. A rocket craft comprising a casing having a rigid body portion with an orifice therein, a nozzle having a base portion with an orifice adjacent said casing orifice and adapted to closely fit said casing body portion when in contact therewith, means for movably supporting said nozzle and for selectively tilting and axially displacing said nozzle with respect to said casing and selectively permitting simultaneous radial and axial escape of gas, a pintle rigidly mounted within said casing and extended through said casing orifice, a plug portion on said pintle located within said nozzle and adapted to closely fit said nozzle base portion when in contact therewith, said plug portion being larger in diameter than said orifice in said nozzle base portion, and means for controlling said nozzle supporting means whereby said rocket craft may be steered and the magnitude of the rocket thrust may be varied, neutralized or reversed.

7. The apparatus of claim 6 wherein said nozzle base portion has a radially extending curved flange portion with a plurality of bosses thereon.

8. The apparatus of claim 7 wherein said nozzle supporting means comprises of a plurality of piston and cylinder units having piston rods which are movably attached to said bosses.

9. The apparatus of claim 8 wherein said piston rods are slidably mounted on said motor casing.

10. The apparatus of claim 6 wherein said means for controlling said nozzle supporting means comprises a guidance control system.

References Cited by the Examiner

UNITED STATES PATENTS

| | | | |
|---|---|---|---|
| 2,921,435 | 1/60 | Landgraf | 60—35.54 |
| 2,952,124 | 9/60 | Pearson | 60—35.54 |
| 3,022,963 | 2/62 | Frost et al. | 244—52 X |
| 3,094,072 | 6/63 | Parilla | 60—35.55 X |
| 3,151,446 | 10/64 | Parilla. | |

MARK NEWMAN, *Primary Examiner.*

SAMUEL LEVINE, *Examiner.*